Figure 1:
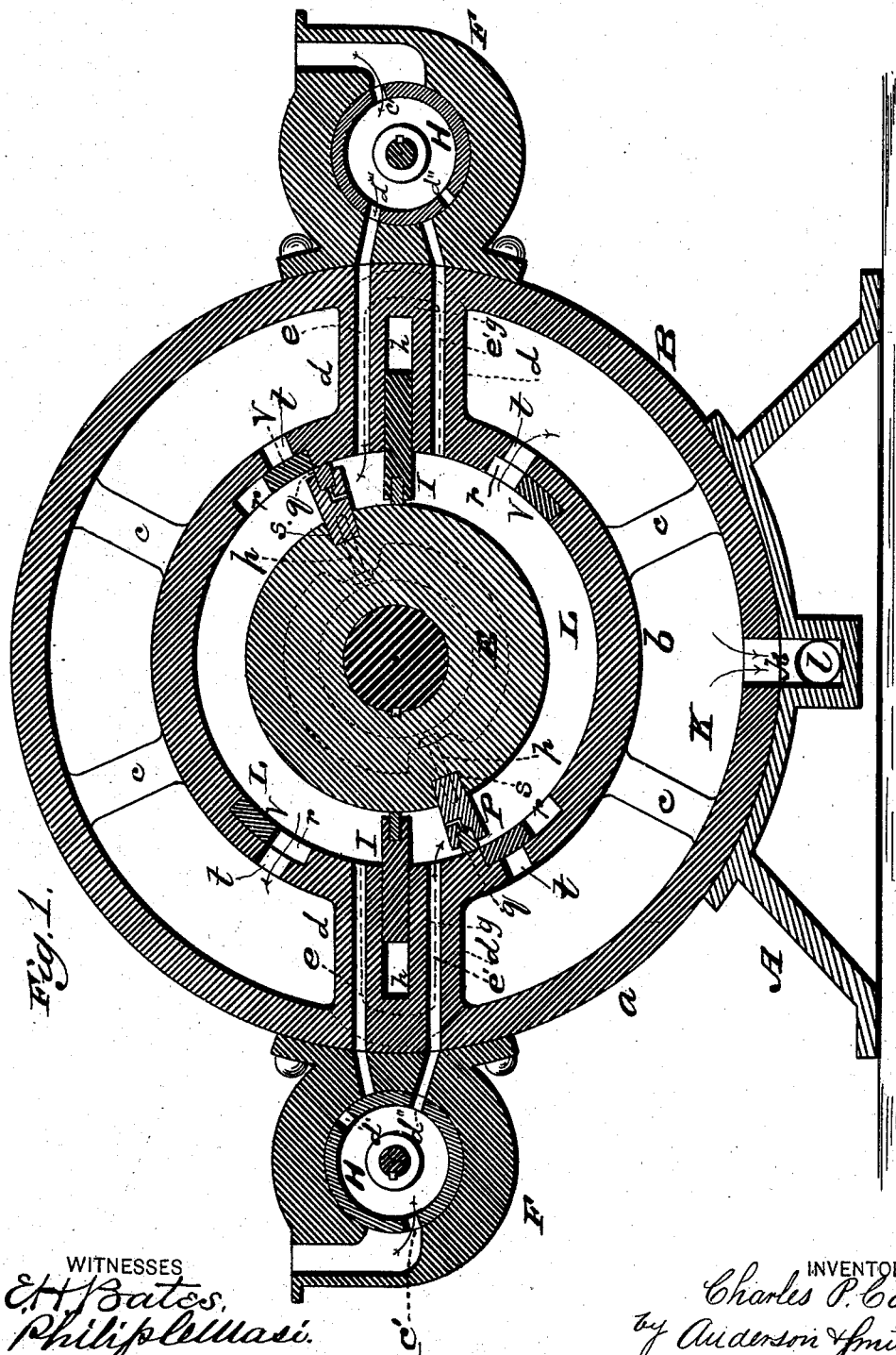

(No Model.)  7 Sheets—Sheet 1.

C. P. CASE.
ROTARY ENGINE.

No. 273,951. Patented Mar. 13, 1883.

WITNESSES
E. H. Bates.
Philip Mauri.

INVENTOR
Charles P. Case,
by Anderson & Smith
his ATTORNEYS

N. PETERS, Photo-Lithographer, Washington, D. C.

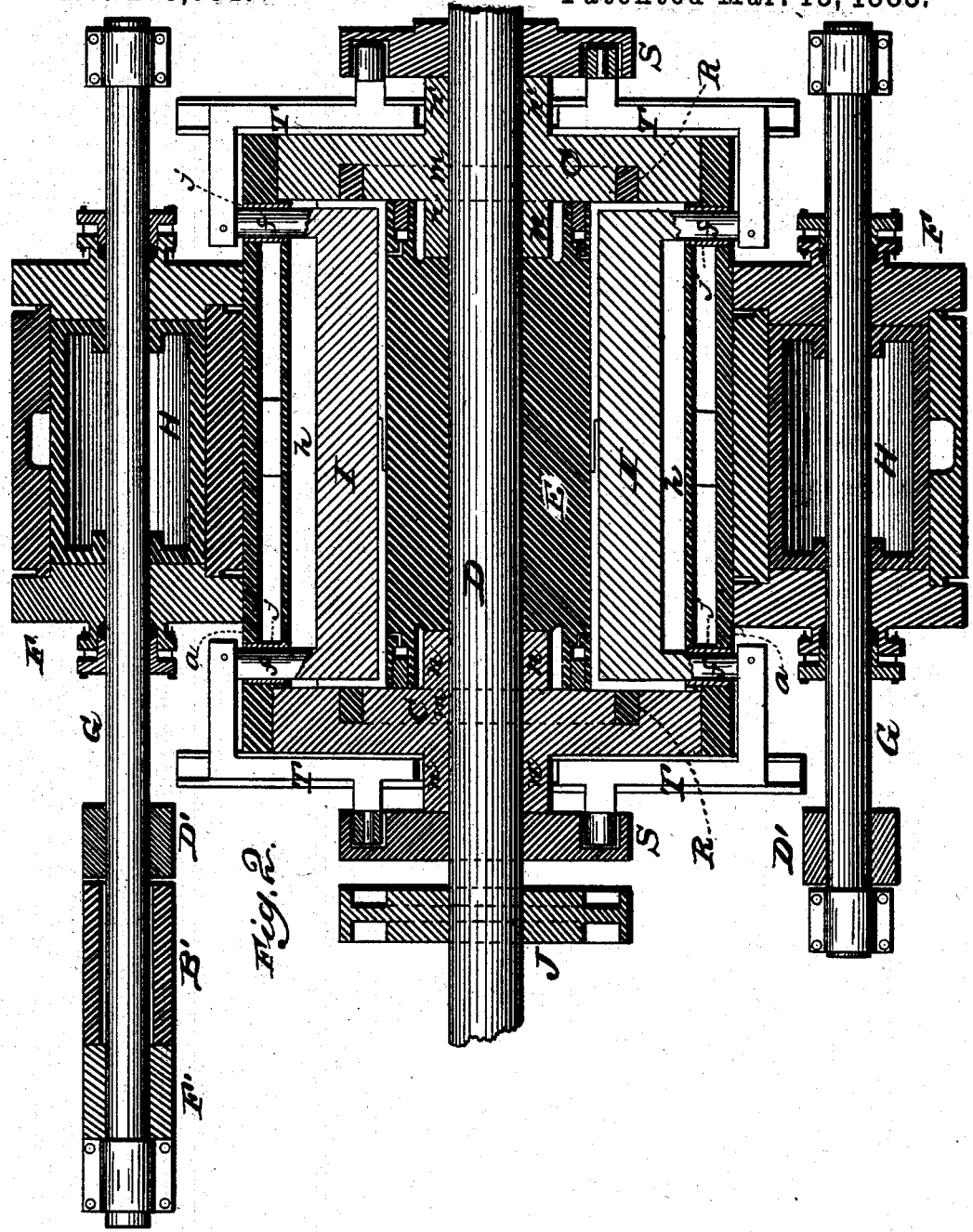

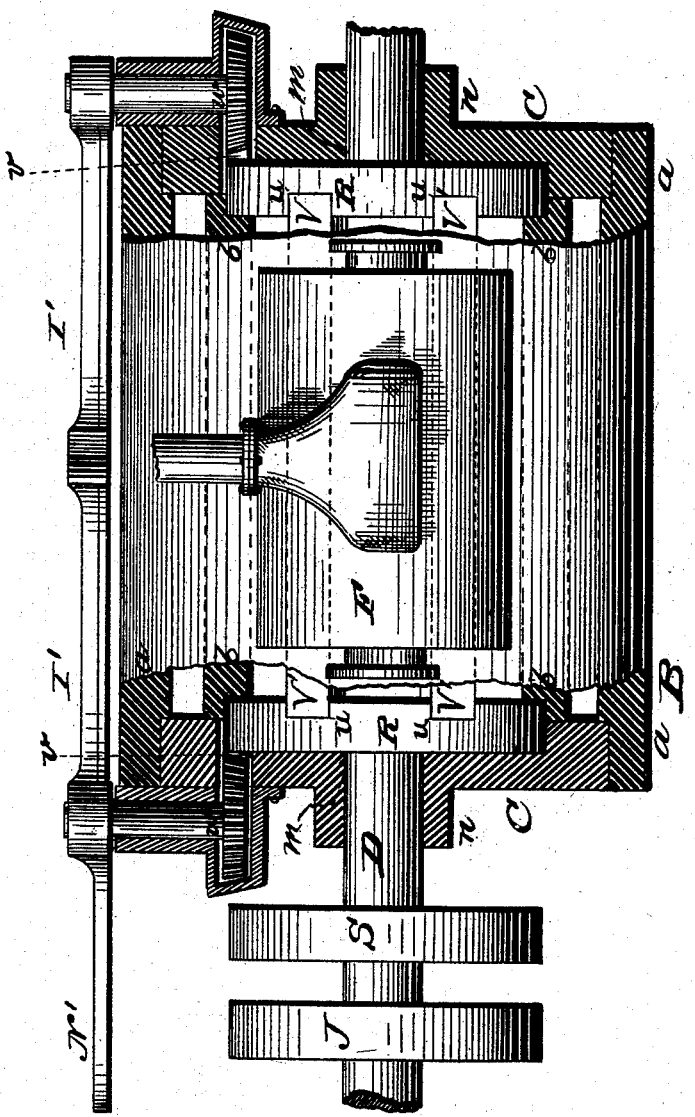

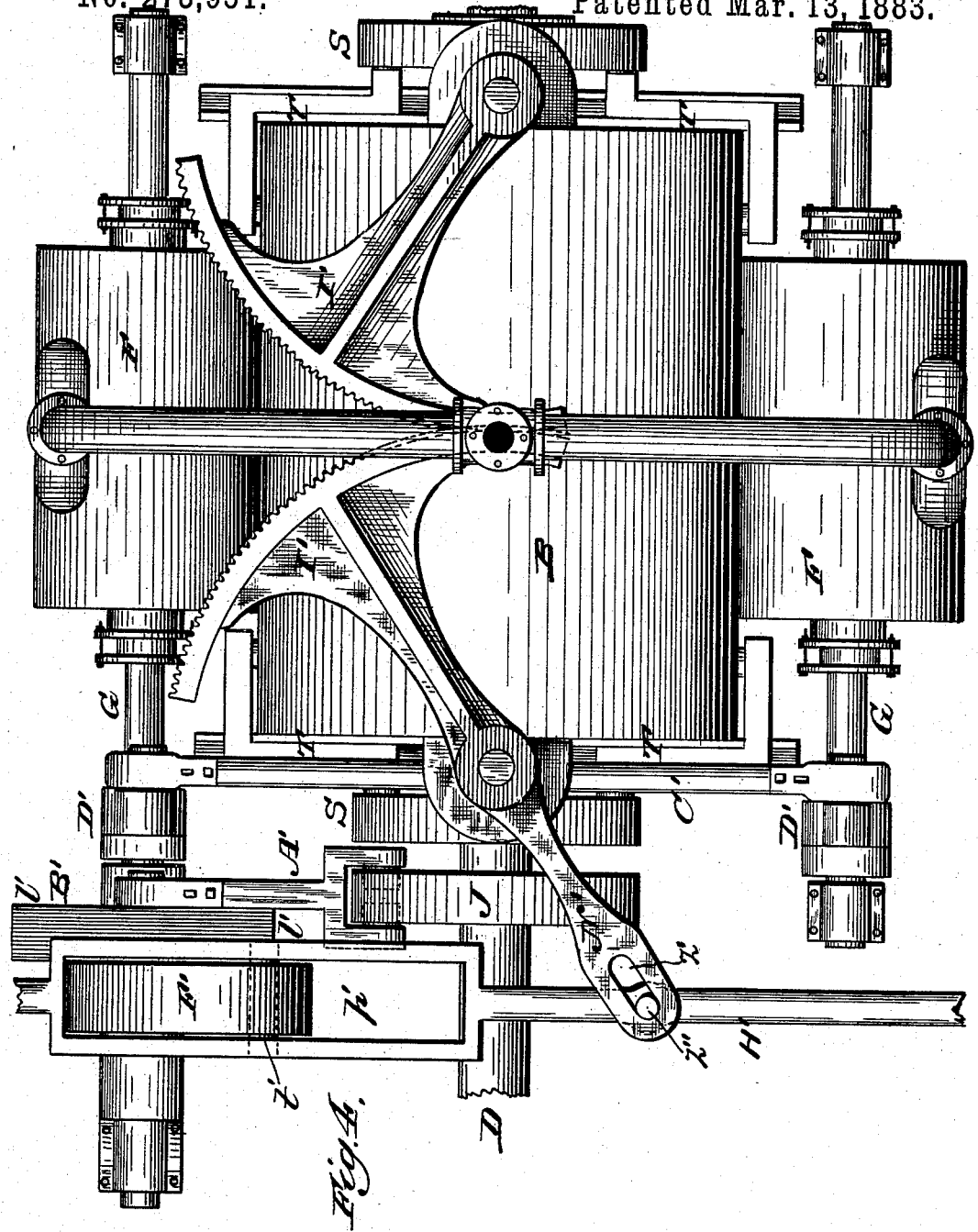

(No Model.)
7 Sheets—Sheet 5.
C. P. CASE.
ROTARY ENGINE.
No. 273,951.  Patented Mar. 13, 1883.
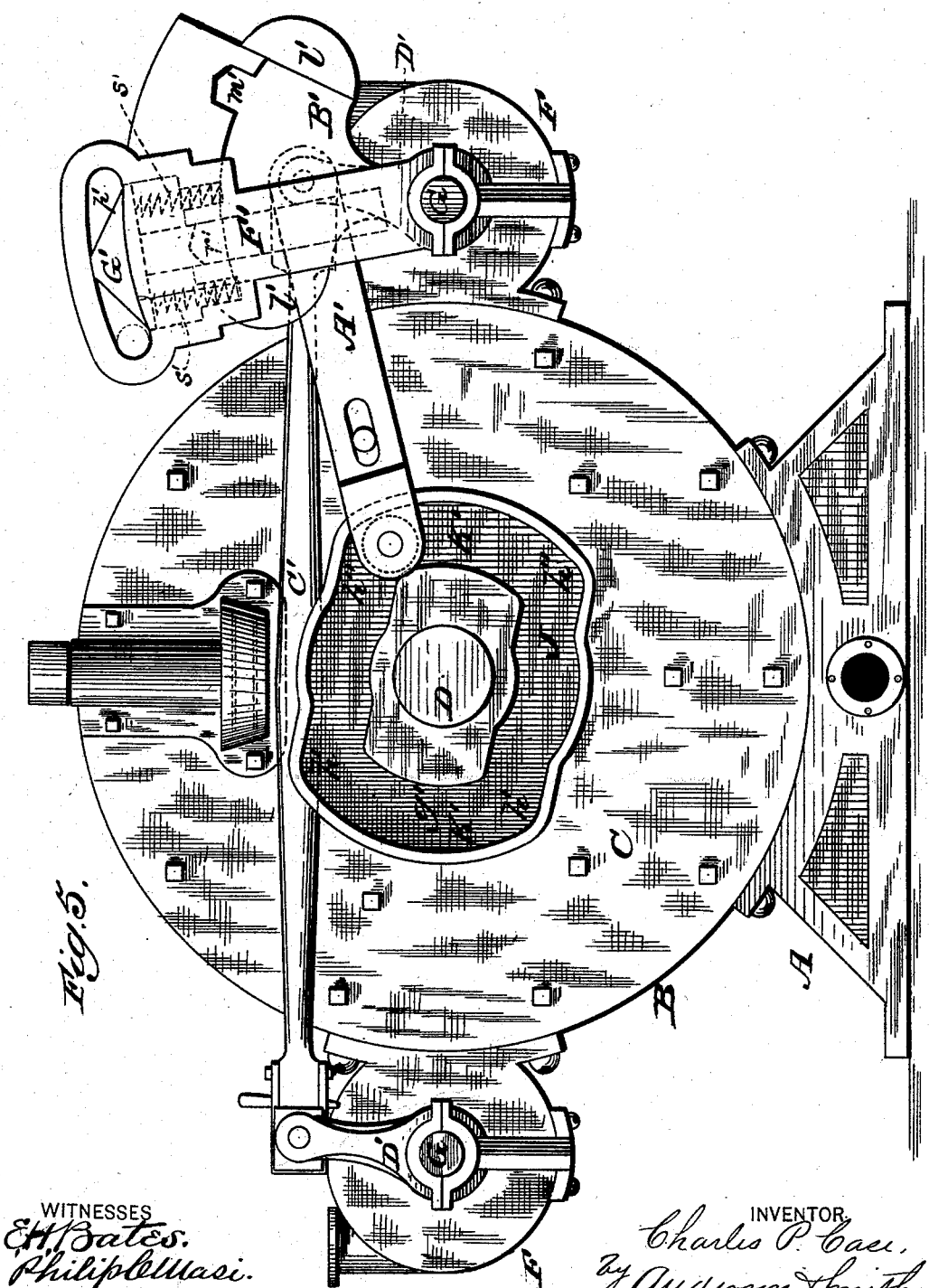
WITNESSES
E. H. Bates.
Philip Mosi.
INVENTOR
Charles P. Case,
By Anderson & Smith
his ATTORNEYS (No Model.) 7 Sheets—Sheet 6.
C. P. CASE.
ROTARY ENGINE.
No. 273,951. Patented Mar. 13, 1883.
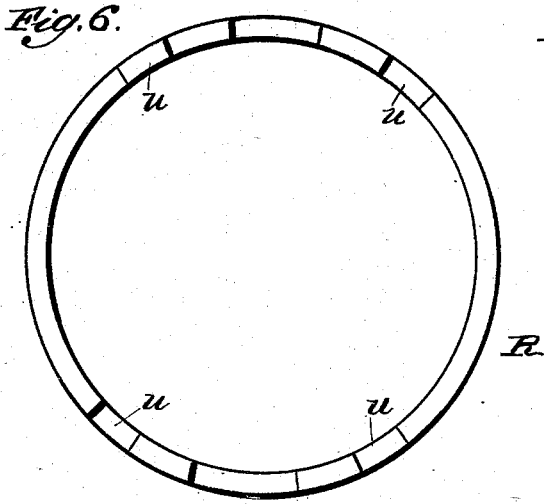
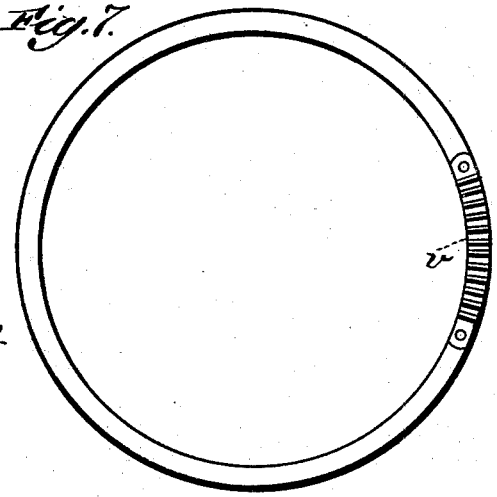
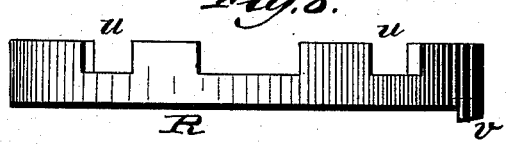
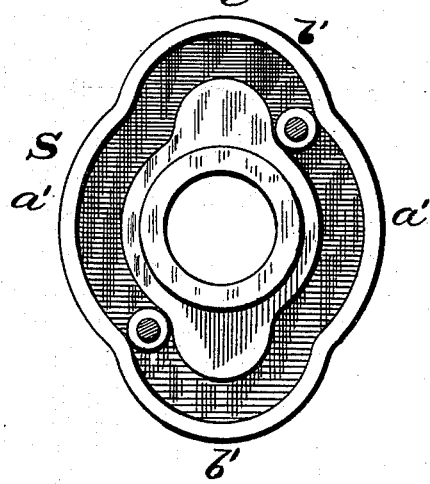
WITNESSES
E. H. Bates.
Philip Mauri.
INVENTOR
Charles P. Case,
by Anderson & Smith
his ATTORNEYS (No Model.)  7 Sheets—Sheet 7.
C. P. CASE.
ROTARY ENGINE.
No. 273,951. Patented Mar. 13, 1883.
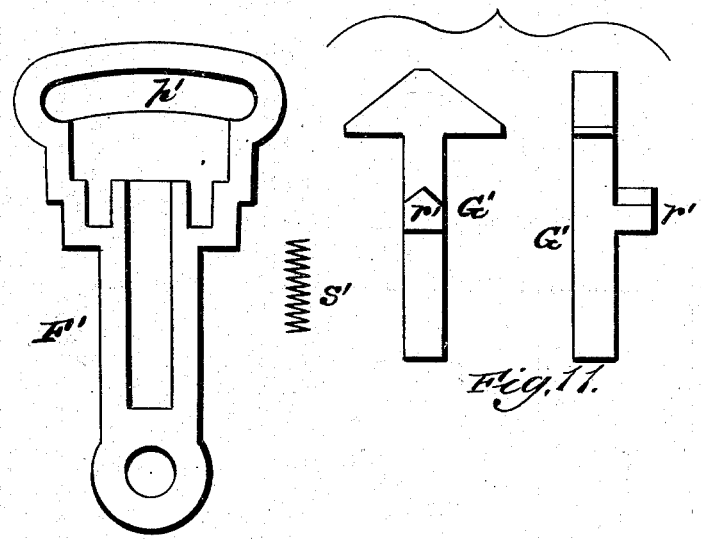
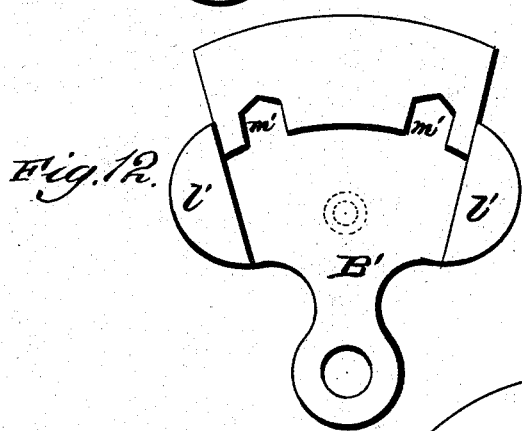
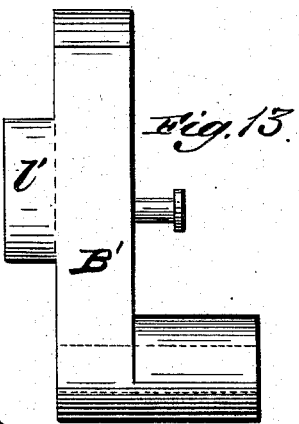
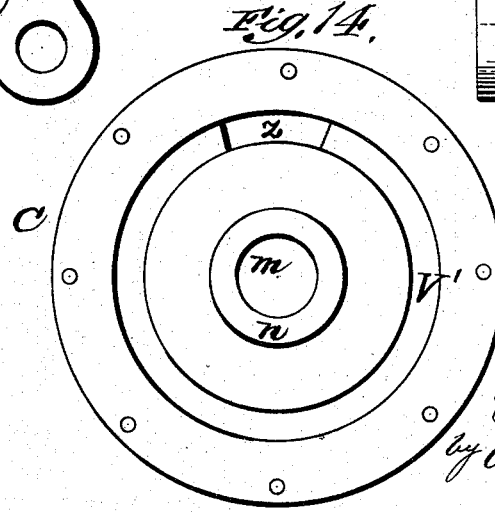
WITNESSES
E. H. Bates
Philip Mmasi
INVENTOR
Chas. P. Case,
by Anderson & Smith
his ATTORNEYS

UNITED STATES PATENT OFFICE.

CHARLES P. CASE, OF HORSEHEADS, NEW YORK, ASSIGNOR OF ONE-HALF TO G. F. TOMLINSON, OF SAME PLACE.

ROTARY ENGINE.

SPECIFICATION forming part of Letters Patent No. 273,951, dated March 13, 1883.

Application filed November 23, 1882. (No model.)

*To all whom it may concern:*

Be it known that I, CHAS. P. CASE, a citizen of the United States, residing at Horseheads, in the county of Chemung and State of New York, have invented certain new and useful Improvements in Rotary Engines; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical transverse sectional view of my engine. Fig. 2 is a horizontal sectional view of the same. Fig. 3 is a side view, part sectional, having the base removed. Fig. 4 is a top or plan view of the engine. Fig. 5 represents an end view of the same. Figs. 6, 7, and 8 are detail views of the piston-rings. Fig. 9 is a side view of one of the cams, S, detached from the engine. Fig. 10 is a side view of the arm F. Fig. 11 is a detail view of the bar G. Fig. 12 is a side view of the arm B'. Fig. 13 is an edge view of the same, and Fig. 14 is an inside view of one of the cylinder-heads C detached from the engine.

This invention has relation to rotary steam-engines; and it consists in the construction and novel arrangement of devices, as hereinafter set forth, and particularly pointed out in the claims appended.

In the accompanying drawings, the letter A designates the base or supporting-frame of the engine.

B represents the main double-wall cylinder, which is bolted to the frame A, and is provided with removable heads C.

D is the rotary shaft, the axis of which is coincident with the axis of the cylinder. On this shaft is keyed the piston-carrying cylinder E.

F F represent the valve-chests, which are secured to the opposite sides of the main cylinder B. In these valve-chests are arranged upon shafts G, parallel with the main shaft D, the vibratory cylindrical valves H, which are designed to work in unison. The main cylinder B is cast entire, with an outer cylindrical wall, $a$, and an inner cylindrical wall, $b$. The interval between these walls is open at each end; but the walls are connected by radial posts $c$ and by transverse connections $d$, laterally arranged, and having steam-passages $e$ and $e'$ extending through them, opening on the outside surface of the outer wall, $a$, and at the inside surface of the inner wall, $b$. From the inner cylinder is thrown out on each side a rib, $g$, extending from end to end, and channeled from the inner wall of the cylinder radially and horizontally, as indicated at $h$. This channel forms the slideway and recess for the abutment I.

Through the lower portion of the outer wall, $a$, of the main cylinder is made the exhaust-opening $k$, which leads from the exhaust-way K within the cylinder into the exhaust-way $l$ in the base.

The heads C are bolted to the main cylinder. They are provided with central openings, $m$, for the passage of the shaft, and the walls of these openings are re-enforced by annular bosses $n n'$, inside and outside, so that they form strong bearings. The ends of the piston-carrying cylinder E are recessed to receive the inner bosses of the heads, as shown in the drawings, and also to provide room for manipulating the screws $p$, which hold the bar-pistons P in their seats $s$. These seats are longitudinal channels formed in the outer wall of the cylinder E, on opposite sides thereof. Each piston is provided with packing $q$, as indicated, and is designed to move freely but closely in contact with the inner wall of the main cylinder.

In the abutment-recess $h$, on each side of the main cylinder, is seated a longitudinal abutment-slide, I, which is designed to play back and forth into said recess, and out therefrom sufficiently to extend across the steamway L, between the inner wall of the main cylinder B and the outer surface of the piston-carrying cylinder E.

In the inner wall, $b$, of the main cylinder, on each side, above and below the abutment-recess, are made longitudinal recesses $r$, communicating with exhaust-ports $t$, which extend through said wall $b$ and communicate with the exhaust-way K. In these recesses are seated the bar-valves V, which are designed to be removable therein, so as to open or close the ports $t$, according to requirement. These bar-valves have their ends outwardly extended to engage notches $u$ in the adjustable or slide rings R, which are seated in annular ways V' in the heads C, and are provided with toothed segments $v$ to engage pinions $w$, seated in bearings on the outside of the heads, slots $z$ being cut in said heads in order to make the engagement. These valves V are therefore all moved at once when the adjustment is effected, the object being to close one set of exhaust-ports and open the other when reversing the engine.

The abutments I have reciprocating motion in their seats, being moved out of the piston-chamber when the pistons approach their location, and being moved back into the way-chamber when the pistons have passed. This motion is effected by means of groove-cams S on the main shaft at each end of the cylinder B, said cams engaging angular slide-arms T, which are connected to arms or projections $f$ of said abutments, which extend through passages $j$, made in the outer wall of the cylinder B, near each end. The groove-cam is isometric, having the lateral circular branches $a'$, concentric with the shaft, and eccentric projecting curved branches $b'$ at each end.

The valves H are similar in form, each being cylindrical and hollow, and having a supply-port, $c'$, and discharge-ports $d'$ and $d''$, serving respectively for the direct action and the reverse action of the engine. From the seats of the cylinder-valves in the chests F lead the direct steam-passages $e$ and $e'$, passing through the exhaust-chamber by the connections $d$ to the steam-chamber above and below the abutment-recesses. The valves H are moved by the cam J, which is keyed on the main shaft at one end of the cylinder. This cam is provided with a cam-groove, $g'$, having concentric portions or rests $h'$ and $h''$, respectively, at the sides and ends of the cam and acting portions K'. The cam engages a wrist-pin on the end of the arm A', the outer end of which is pivoted to an arm, B', which is connected to the shaft G of one of the valves H, and operates said valve to let on and cut off steam. As the engine is double-acting, this valve H must be connected to the valve H at the other end of the cylinder, so that they will work in unison, and this is effected by means of a connecting-rod, C', which extends from an arm, D', of the shaft of the first valve to an arm, D', of the shaft of the other. The shaft G, however, of the first valve, H, is indirectly connected to the arm A', which extends to the cam, through the arm B', loose on said shaft, an arm, F', which is keyed to said shaft, and a slide-bolt, G', in the following manner: The arm B' is sector-shaped, and is formed with end stops, $l'$, and lateral catch-recesses $m'$ near said stops. The arm F' is formed with a slotted upper end, and is provided with a cam-headed bolt, G', which is held outward against the outer wall of the slot $p'$ by means of a spring, $s'$. The cam-headed bolt is also provided with a catch projection, $r'$, which is designed to engage one or the other of the notches $m'$ of the arm B', which is arranged to face the arm F' and its bolt G'.

This construction enables the engine to be readily reversed without interfering with the movement of the cam.

The operating-rod H' is connected to the arm F' by means of a roller-bearing, $t'$, which passes through the slot $p'$ of said arm, and is held in one end thereof by the cam-headed bolt. When said rod is moved to reverse the engine the roller-bearing $t'$ depresses the bolt G' and releases the same from the arm B'. The arm F' is now moved by continuing the action of the operating-rod until the projection of said bolt engages the notch at the other end of the sector-arm B'. This change of position is at once communicated to the valve H at this end through the arm F' and shaft G, and the valve H at the other end of the cylinder through the sector-arm B', the connecting-rod C', the arm E', and the valve-shaft.

In order to move the bar-valves V of the exhaust at the same time that the action of the valves H is reversed, the stems of the pinions $w$, which operate the slide-rings, are provided with toothed sector-arms I', which are pivoted near the ends of the cylinder and extend toward each other to engage above the cylinder B, as indicated in the drawings. In this manner they are made to work together to move the slide-rings R at the ends of the cylinder at the same time, and one of the arms I' is formed with an extension, N', which is slotted at $z'$ to engage a stud, $z''$, on the operating-rod H', so that when the operating-rod is moved to reverse the cylinder-valves the bar-valves of the exhaust are correspondingly adjusted at the same time.

In the construction of this engine it is designed, in order to avoid noise in the working of the parts, to employ, in connection with the groove-cams, rollers having exterior bearing-surfaces, of rubber or other tough material, and metallic cores.

Having described this invention, what I claim, and desire to secure by Letters Patent, is—

1. In a rotary steam-engine, the combination, with the double-wall cylinder B, having the removable heads C, radial posts $c$, ribs $g$, having recesses $h$, of the abutments I, cylinder E, bar-pistons P, and perforated connections, substantially as specified.

2. The combination, with the double-wall cylinder B, having the lateral recessed ribs, perforated connections, and slotted heads C, of the piston-carrying cylinder, its shaft D, the bar-valves V, steam-valves H, cams S, slide-rings R, pinions $w\ w$, and connections $d\ d$, substantially as specified.

3. In a rotary steam-engine having concentric steam and exhaust chambers, the combination, with the lateral rotary valve or valves, of the valve-shaft having a loose arm connected to a groove-cam on the main shaft of the engine, and a fixed operating-arm provided with a catch-bolt for the loose arm, substantially as specified.

4. In a rotary steam-engine, the combination, with rotary steam-valves H, independent exhaust-valves, and a groove-cam on the main shaft operating the rotary valve, of a loose arm on the valve-shaft, a fixed arm having a spring-catch for the loose arm, and devices, substantially as shown, engaging the operating-rod to move the exhaust-valves, substantially as specified.

5. In a rotary steam-engine having radially-sliding abutments, rotary steam-valves, and reciprocating exhaust-valves, the main shaft, and the cams on said main shaft, respectively moving the steam-valves and the reciprocating abutments without moving the exhaust-valves, substantially as specified.

6. The combination, with reciprocating exhaust-valves in the cylinder-wall between the exhaust and steam chambers, of the end rings engaging the ends of the exhaust-valves, and operated by rack-and-pinion movement, substantially as specified.

7. The combination, with the groove-cams of a rotary engine, of the rollers having exterior bearing-surfaces of rubber or tough material, and metallic cores, substantially as specified.

8. In a reversible rotary steam-engine, the combination, with the direct steam ports and valves, of the independent exhaust-ports connecting the steam-chamber immediately with the exhaust-chamber, and the exhaust-valves operating in connection with said ports, substantially as specified.

In testimony whereof I affix my signature in presence of two witnesses.

CHARLES P. CASE.

Witnesses:
PHILIP C. MASI,
M. P. CALLAN.